United States Patent
Chung et al.

(10) Patent No.: US 10,812,537 B1
(45) Date of Patent: Oct. 20, 2020

(54) USING NETWORK LOCALITY TO AUTOMATICALLY TRIGGER ARBITRARY WORKFLOWS

(71) Applicant: Amazon Technologies, Inc., Seattle, WA (US)

(72) Inventors: Peter Chung, Lynnwood, WA (US); Jason S. Bailey, Kenton, KY (US); Ryan S. Corlett, Renton, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 268 days.

(21) Appl. No.: 16/042,895

(22) Filed: Jul. 23, 2018

(51) Int. Cl.
 *H04L 29/06* (2006.01)
 *H04L 29/12* (2006.01)

(52) U.S. Cl.
 CPC ...... *H04L 65/1069* (2013.01); *H04L 61/1511* (2013.01); *H04L 65/1063* (2013.01); *H04L 63/02* (2013.01)

(58) Field of Classification Search
 None
 See application file for complete search history.

(56) References Cited

U.S. PATENT DOCUMENTS

| | | | | |
|---|---|---|---|---|
| 6,539,237 B1* | 3/2003 | Sayers | .................. | H04W 88/08 455/461 |
| 7,194,004 B1* | 3/2007 | Thomsen | .............. | H04L 63/101 370/401 |
| 7,568,092 B1* | 7/2009 | Englund | ............... | H04L 63/102 380/255 |
| 8,023,985 B1* | 9/2011 | Szwerinski | ........... | H04W 76/00 455/522 |
| 8,402,134 B1* | 3/2013 | Hir | .................... | H04W 12/1206 709/224 |
| 8,682,323 B2* | 3/2014 | Dei | ......................... | H04M 3/38 455/435.2 |
| 9,705,919 B1* | 7/2017 | Jacobsen | ................. | H04L 63/20 |
| 9,955,352 B2* | 4/2018 | Mahaffey | .............. | H04M 15/58 |
| 10,356,620 B1* | 7/2019 | Obaidi | .................. | H04W 12/06 |
| 10,362,159 B1* | 7/2019 | Venkatachalam | ....... | H04W 4/12 |
| 2002/0095569 A1* | 7/2002 | Jerdonek | ............... | H04L 9/3271 713/155 |
| 2003/0149891 A1* | 8/2003 | Thomsen | .............. | H04W 12/12 726/13 |
| 2003/0220107 A1* | 11/2003 | Lioy | ............... | H04W 12/04033 455/435.1 |
| 2004/0192303 A1* | 9/2004 | Puthenkulam | .... | H04W 12/1206 455/435.1 |
| 2004/0243994 A1* | 12/2004 | Nasu | ........................ | G06F 8/65 717/171 |

(Continued)

*Primary Examiner* — Backhean Tiv
(74) *Attorney, Agent, or Firm* — Thomas | Horstemeyer, LLP (57) ABSTRACT

Disclosed are various embodiments for using network locality to automatically trigger arbitrary workflows either by assertion or implication. In one embodiment, a communication is received from a client device via an external network host connected to an external network. The client device is configured to initiate the communication to the external network host on a repeated basis. The external network host is unreachable from an internal network. Access by the client device to at least one resource on the internal network is then disabled in response to receiving the communication.

20 Claims, 7 Drawing Sheets

(56) References Cited

U.S. PATENT DOCUMENTS

| | | | |
|---|---|---|---|
| 2005/0186954 A1* | 8/2005 | Kenney | H04M 1/67 455/420 |
| 2005/0254652 A1* | 11/2005 | Engler | H04L 9/3273 380/270 |
| 2006/0174037 A1* | 8/2006 | Bernardi | H04L 63/0492 709/245 |
| 2007/0178881 A1* | 8/2007 | Teunissen | G06F 21/305 455/410 |
| 2007/0266422 A1* | 11/2007 | Germano | H04W 12/1208 726/1 |
| 2008/0018927 A1* | 1/2008 | Martin | H04W 12/1206 358/1.15 |
| 2008/0141360 A1* | 6/2008 | Hicks | H04L 63/0236 726/15 |
| 2008/0293397 A1* | 11/2008 | Gajdos | H04W 12/0802 455/420 |
| 2009/0144557 A1* | 6/2009 | Sutton | H04L 9/088 713/189 |
| 2009/0300751 A1* | 12/2009 | Krishnamurthy | H04L 63/0227 726/13 |
| 2010/0218012 A1* | 8/2010 | Joseph | G06F 21/86 713/310 |
| 2011/0023069 A1* | 1/2011 | Dowens | H04N 21/23109 725/61 |
| 2011/0246765 A1* | 10/2011 | Schibuk | H04L 63/0823 713/158 |
| 2012/0226905 A1* | 9/2012 | Mohanty | H04W 12/0609 713/168 |
| 2014/0052980 A1* | 2/2014 | Siegel | H04L 9/3234 713/153 |
| 2014/0075513 A1* | 3/2014 | Trammel | H04L 63/0876 726/4 |
| 2014/0101324 A1* | 4/2014 | Young | H04L 12/4687 709/228 |
| 2014/0165149 A1* | 6/2014 | Chen | H04L 63/101 726/4 |
| 2014/0165165 A1* | 6/2014 | Story, Jr. | H04W 12/04031 726/6 |
| 2014/0171024 A1* | 6/2014 | Huang | H04W 12/0608 455/411 |
| 2014/0259093 A1* | 9/2014 | Narayanaswamy | H04L 63/0272 726/1 |
| 2014/0359098 A1* | 12/2014 | Xu | H04L 63/0838 709/223 |
| 2014/0359793 A1* | 12/2014 | Dobson | G06F 21/6245 726/30 |
| 2015/0223068 A1* | 8/2015 | Thelen | H04W 12/003 726/7 |
| 2015/0372980 A1* | 12/2015 | Eyada | H04L 63/1441 726/1 |
| 2016/0050227 A1* | 2/2016 | Desai | H04W 12/06 726/3 |
| 2016/0135037 A1* | 5/2016 | Chiaramello | H04W 8/005 455/456.1 |
| 2016/0183166 A1* | 6/2016 | Chen | H04W 48/02 455/435.1 |
| 2017/0093821 A1* | 3/2017 | Camenisch | H04L 63/061 |
| 2017/0295142 A1* | 10/2017 | Schibuk | H04L 63/0428 |
| 2018/0184228 A1* | 6/2018 | Xie | H04W 4/203 |
| 2019/0141015 A1* | 5/2019 | Nellen | H04L 63/20 |
| 2019/0289464 A1* | 9/2019 | Loreskar | H04L 63/0892 |

\* cited by examiner

USING NETWORK LOCALITY TO AUTOMATICALLY TRIGGER ARBITRARY WORKFLOWS

BACKGROUND

Organizations often establish an internal network that is separate from the public Internet. Though systems on the internal network may have access to the Internet via a gateway, external systems generally cannot initiate communication with systems on the internal network. Internal networks may use private network addresses that are not routable on the Internet, potentially in conjunction with private domain name system (DNS) servers.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to using network locality to automatically trigger arbitrary workflows either by assertion or implication. Internal networks of organizations often include systems that are sensitive from the security standpoint. For example, proprietary and confidential information may be stored by internal network data stores. As a result, it is desirable to limit access to authorized users whose devices are connected within the internal network. Moreover, to prevent data exfiltration among other issues, it is important to maintain the security of devices that are or have been connected to the internal network.

Sometimes internal network devices, particularly mobile devices such as laptops, tablets, and smart phones, are lost or stolen and end up in the possession of a malicious user. These internal network devices may store security credentials for the internal network that may be used to access internal network resources with remotely via a virtual private network gateway. Alternatively, an attacker may leverage a physical compromise or software compromise to gain initial access to the internal network, which may be further exploited through use of the security credentials.

Various embodiments of the present disclosure introduce approaches to trigger arbitrary workflows based on network locality (e.g., to disable privileged access of internal network devices when they are connected to an external network). In one embodiment, a device may be configured to attempt periodically to communicate with a certain host on an external network. Under normal operation in the internal network, communication with the host is blocked. However, if the device is operated on the external network, the communication succeeds, and the access of the device can be disabled. In another embodiment, a device may be configured to communicate periodically with a certain host on the internal network that is not reachable via the external network. If the device is operated on the external network, the communication fails, and the access of the device can be disabled.

As one skilled in the art will appreciate in light of this disclosure, certain embodiments may be capable of achieving certain advantages, including some or all of the following: (1) improving computer network security by automatically disabling accounts, security credentials, or devices when an internal network device is used on an external network, thereby preventing data exfiltration or misuse of secured resources through lost or stolen devices; (2) improving the operation of a computer by automatically recognizing when an internal network device is used on an external network, and so forth.

Figure 1:
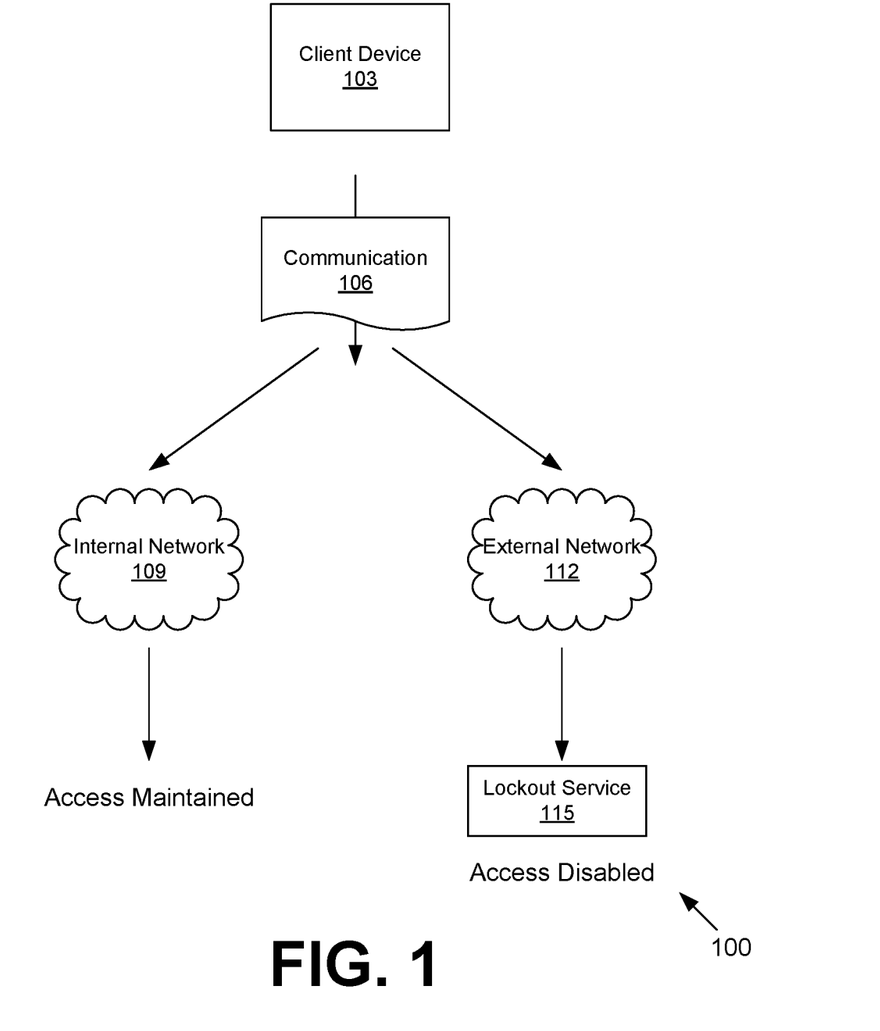
FIG. 1 is a drawing of an example scenario according to an embodiment of the present disclosure.

Turning to FIG. 1, shown is a drawing of an example scenario in accordance with an embodiment of the present disclosure. A client device 103 is normally used on an internal network 109. The client device 103 is configured to periodically or repeatedly send a communication 106 to a host located on an external network 112. When the communication 106 is routed through the internal network 109, the communication 106 is ultimately dropped. No action is taken, and access of the client device 103 to resources of the internal network 109 is maintained.

However, if the client device 103 is connected to the external network 112 and the communication 106 is routed through the external network 112, the communication is received by a lockout service 115. The lockout service 115 then disables the access of the client device 103 to resources of the internal network 109. In the following discussion, a general description of the system and its components is provided, followed by a discussion of the operation of the same.

Figure 2:
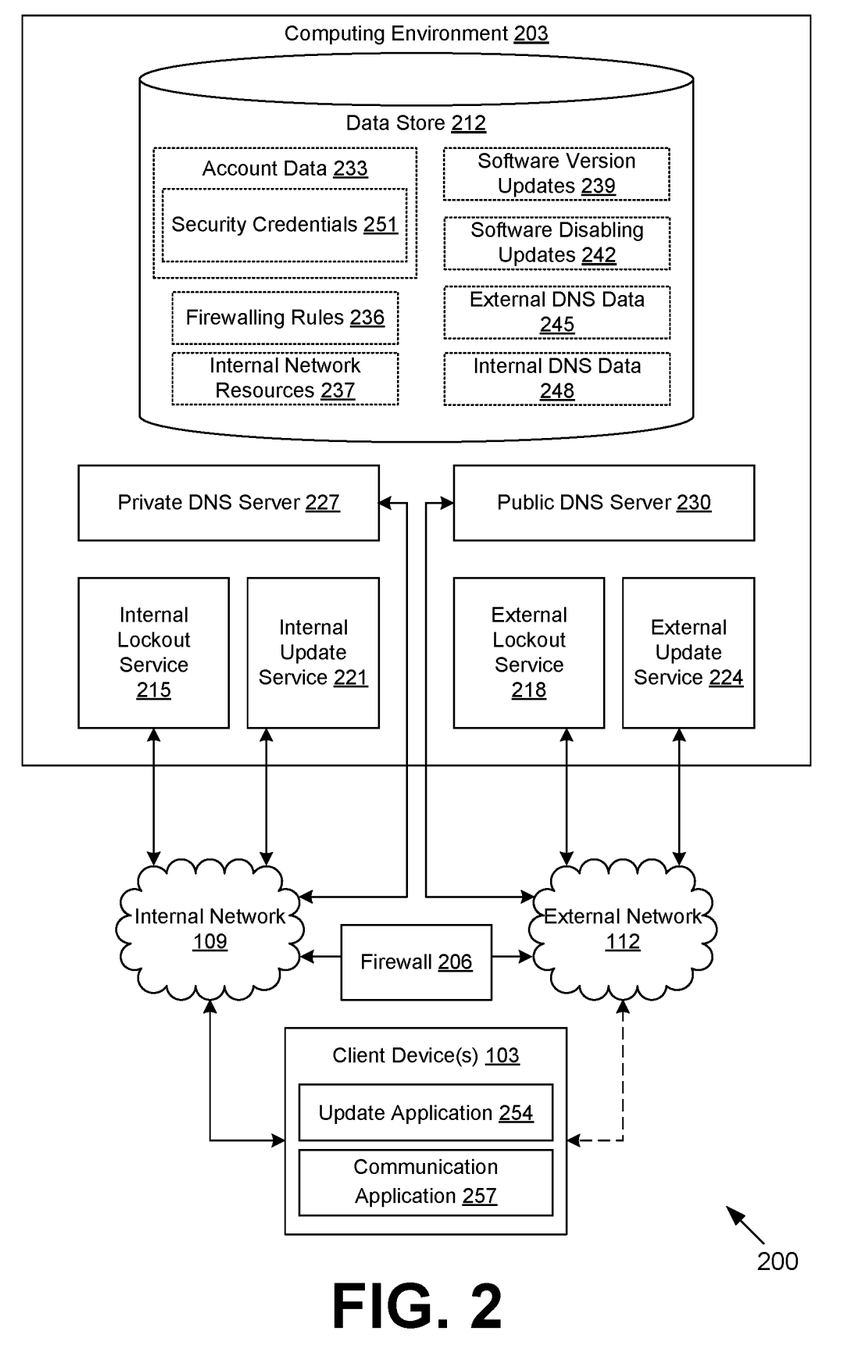
FIG. 2 is a schematic block diagram of a networked environment according to various embodiments of the present disclosure.

With reference to FIG. 2, shown is a networked environment 200 according to various embodiments. The networked environment 200 includes a computing environment 203 and one or more client devices 103, which may be in data communication with each other via the internal network 109 or the external network 112. The internal network 109 includes, for example, intranets, wide area networks (WANs), local area networks (LANs), wired networks, wireless networks, cable networks, satellite networks, other suitable networks, etc., or any combination of two or more such networks. The external network 112 includes, for example, the Internet, wide area networks (WANs), local area networks (LANs), wired networks, wireless networks, cable networks, satellite networks, or other suitable networks, etc., or any combination of two or more such networks.

The internal network 109 and the external network 112 may be physically and/or logically isolated from one another. For example, the transmission of data between the internal network 109 and the external network 112 may be isolated for security reasons. The internal network 109 may be a trusted network while the external network 112 may be an untrusted network. The internal network 109 may be a first party network while the external network 112 may be a third party network. The internal network 109 may adopt a private network address space and may be separated from the external network 112 by way of a firewall 206. However, in some cases, the internal network 109 may adopt a public network address space. The internal network 109 and the computing environment 203 may be operated by the same organization. In various scenarios, the external network 112 may be a public network or a non-public network.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include an internal lockout service 215, an external lockout service 218, an internal update service 221, an external update service 224, a private domain name system (DNS) server 227, a public DNS server 230, and other applications, services, processes, systems, engines, or functionality not discussed in detail herein. The internal lockout service 215 may be executed to receive repeated or periodic communications from client devices 103 that are connected to the internal network 109 and not to receive those communications when the client devices 103 are connected to the external network 112. As a consequence, the internal lockout service 215 may disable access of the client device 103 to resources of the internal network 109 when an expected communication from the client device 103 is not received.

The external lockout service 218 may be executed to receive communications from client devices 103 that are connected to the external network 112. The external lockout service 218 cannot be contacted by the client device 103 when the client device 103 is connected only to the internal network 109. However, if the client device 103 becomes connected to the external network 112, the external lockout service 218 receives the communication and disables access of the client device 103 to resources of the internal network 109. The external lockout service 218 may be executed in a computing device that is external to the computing environment 203. Alternatively, a proxy or relay service for the external lockout service 218 may be executed in a computing device that is external to the computing environment 203.

The internal update service 221 is executed to serve updates of software to client devices 103 in response to update requests when the client device 103 is connected to the internal network 109. The updates may correspond to version updates of the software. The external update service 224 is executed to serve disabling updates to client devices 103 in response to update requests when the client device 103 is connected to the external network 112. The internal update service 221 and the external update service 224 may share a single hostname that resolves differently depending on whether the requestor is on the internal network 109 or the external network 112. Alternatively, the internal update service 221 and the external update service 224 may be a single service or system that behaves differently based on identifying whether the requestor is on the internal network 109 or the external network 112. The external update service 224 may be executed in a computing device that is external to the computing environment 203. Alternatively, a proxy or relay service for the external update service 224 may be executed in a computing device that is external to the computing environment 203.

The private DNS server 227 may respond to DNS queries from client devices 103 connected to the internal network 109. In particular, the private DNS server 227 may respond to client devices 103 that the external lockout service 218 and/or the external update service 224 are unreachable via the internal network 109, or the private DNS server 227 may resolve queries for them to the internal lockout service 215 or the internal update service 221, respectively.

Likewise, the public DNS server 230 may respond to DNS queries from client devices 103 connected to the external network 112. The public DNS server 230 may respond to client devices 103 that the internal lockout service 215 and/or the internal update service 221 are unreachable via the internal network 109, or the public DNS server 230 may resolve queries for them to the external lockout service 218 or the external update service 224, respectively. The private DNS server 227 and the public DNS server 230 may both be authoritative for the same zones, but using a split-horizon DNS system, the private DNS server 227 and the public DNS server 230 may resolve queries differently. The responses from the public DNS server 230 may be cached by other external DNS servers and devices on the external network 112 to resolve subsequent queries.

The data stored in the data store 212 includes, for example, account data 233, firewalling rules 236, internal network resources 237, software version updates 239, software disabling updates 242, external DNS data 245, internal DNS data 248, and potentially other data. The account data 233 may include data pertaining to user and/or device accounts within the internal network 109. Accounts may be associated with security credentials 251, such as usernames, passwords, public/private key pairs, symmetric keys, and so forth.

The firewalling rules 236 control the operation of the firewall 206. In particular, the firewalling rules 236 may configure the firewall 206 to block access from the internal network 109 to a port or network address used by the external lockout service 218 and/or the external update service 224. Similarly, the firewalling rules 236 may configure the firewall 206 to block access from the external network 112 to a port or network address used by the internal lockout service 215 and/or the internal update service 221.

The internal network resources 237 may correspond to web pages, web applications, files, media, and/or other data for which access is restricted to users or devices that have valid accounts with valid security credentials 251. The internal network resources 237 may be accessible only through the internal network 109.

The software version updates 239 may correspond to incremental updates, configuration updates, security updates, bug fixes, and so forth, which may be sent to client devices 103 on the internal network 109 by the internal update service 221 to update software executed on the client devices 103. The software disabling updates 242 may correspond to software or configuration settings that when installed or implemented on the client devices 103 result in disabling access of the client device 103 to resources of the internal network 109. In some embodiments, the software disabling updates 242 may include firmware that causes the client devices 103 to be "bricked" or otherwise unusable. The software disabling updates 242 are sent to the client devices 103 on the external network 112 by the external update service 224 in response to update requests.

The internal DNS data 248 includes zone data, hostname resolution data, and/or other configuration data for the private DNS server 227. The external DNS data 245 includes zone data, hostname resolution data, and/or other configuration data for the public DNS server 230.

The client device 103 is representative of a plurality of client devices that may be coupled to the internal network 109. The client device 103 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The client device 103 may include a display comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 103 may be configured to execute various applications such as an update application 254, a communication application 257, and/or other applications. The update application 254 may be executed to request software updates from the internal update service 221 via the internal network 109 or the external update service 224 via the external network 112. The update application 254 may send the update request to a single network address or hostname, which may be routed or resolved differently depending on whether the client device 103 is connected to the internal network 109 or to the external network 112.

The communication application 257 may be executed to send communications to the internal lockout service 215 via the internal network 109 or to the external lockout service 218 via the external network 112. The communication application 257 may send the communication to a single network address or hostname, which may be routed or resolved differently depending on whether the client device 103 is connected to the internal network 109 or to the external network 112. The communication application 257 may be a background service or task whose operation is not visibly apparent to users of the client device 103.

The communications may be sent on repeated basis, such as upon start-up of the client device 103, or periodically such as every hour, in response to events and so forth. The communications may be digitally signed by the communication application 257 using a security credential 251 such as a private key from a public/private key pair belonging to an account. In some implementations, the communications may be encrypted using a public key associated with the internal lockout service 215 or the external lockout service 218. The client device 103 may be configured to execute other applications, such as, for example, email applications, social networking applications, word processors, spreadsheets, and/or other applications.

Figure 3:
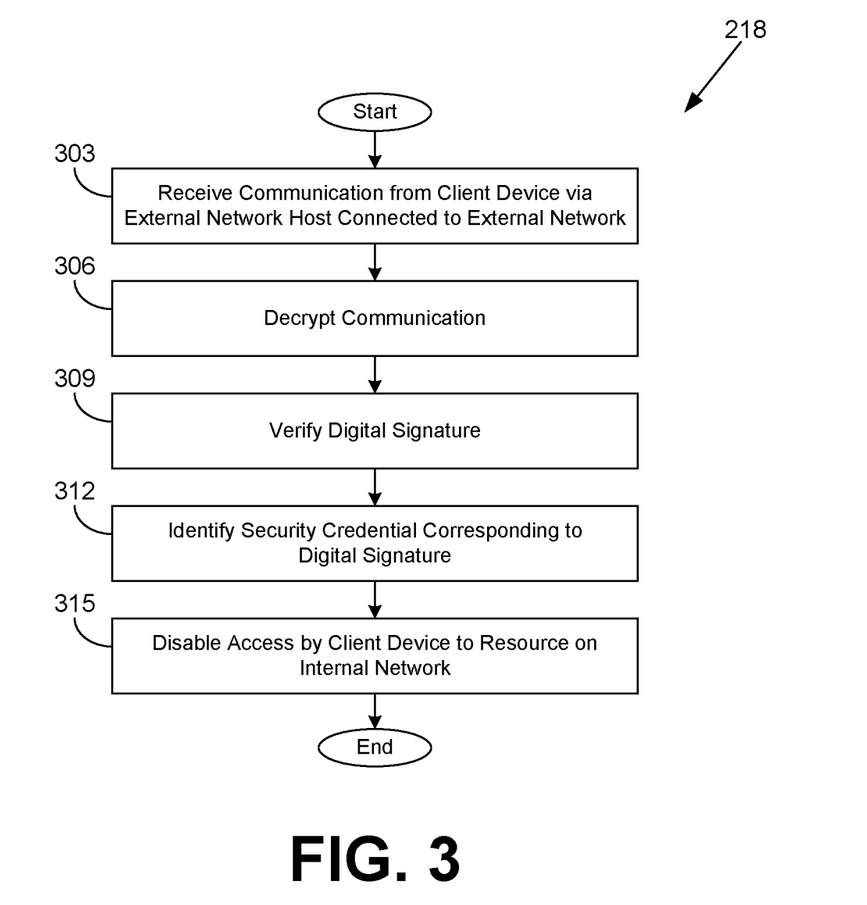
FIG. 3 is a flowchart illustrating one example of functionality implemented as portions of an external lockout service executed in a computing environment in the networked environment of FIG. 2 according to various embodiments of the present disclosure.

Referring next to FIG. 3, shown is a flowchart that provides one example of the operation of a portion of the external lockout service 218 according to various embodiments. It is understood that the flowchart of FIG. 3 provides merely an example of the many different types of functional arrangements that may be employed to implement the operation of the portion of the external lockout service 218 as described herein. As an alternative, the flowchart of FIG. 3 may be viewed as depicting an example of elements of a method implemented in the computing environment 203 (FIG. 2) according to one or more embodiments.

Beginning with box 303, the external lockout service 218 receives a communication from a client device 103 (FIG. 2) via an external network host connected to the external network 112 (FIG. 2). The communication application 257 (FIG. 2) on the client device 103 is configured to repeatedly send similar communications, upon start-up, at periodic intervals, or in response to events. However, the client device 103 is normally connected to the internal network 109 (FIG. 2) and not the external network 112, and either the firewall 206 (FIG. 2) blocks traffic to the external network host via the internal network 109 or the private DNS server 227 used within the internal network 109 fails to resolve a DNS query for a predefined hostname to the external network host.

In box 306, the external lockout service 218 decrypts the communication using a private key. For example, the communication may be decrypted by decrypting a symmetric key using the private key, and then using the decrypted symmetric key to decrypt the communication. In box 309, the external lockout service 218 verifies a digital signature present in the communication. In box 312, the external lockout service 218 identifies a security credential 251 (FIG. 2) and/or account corresponding to the digital signature.

In box 315, the external lockout service 218 disables access by the client device 103 to one or more internal network resources 237 (FIG. 2) on the internal network 109. For example, the external lockout service 218 may revoke the security credential 251, disable the corresponding account, blacklist a network address of the client device 103, or take other actions. Thereafter, the operation of the portion of the external lockout service 218 ends.

Figure 4:
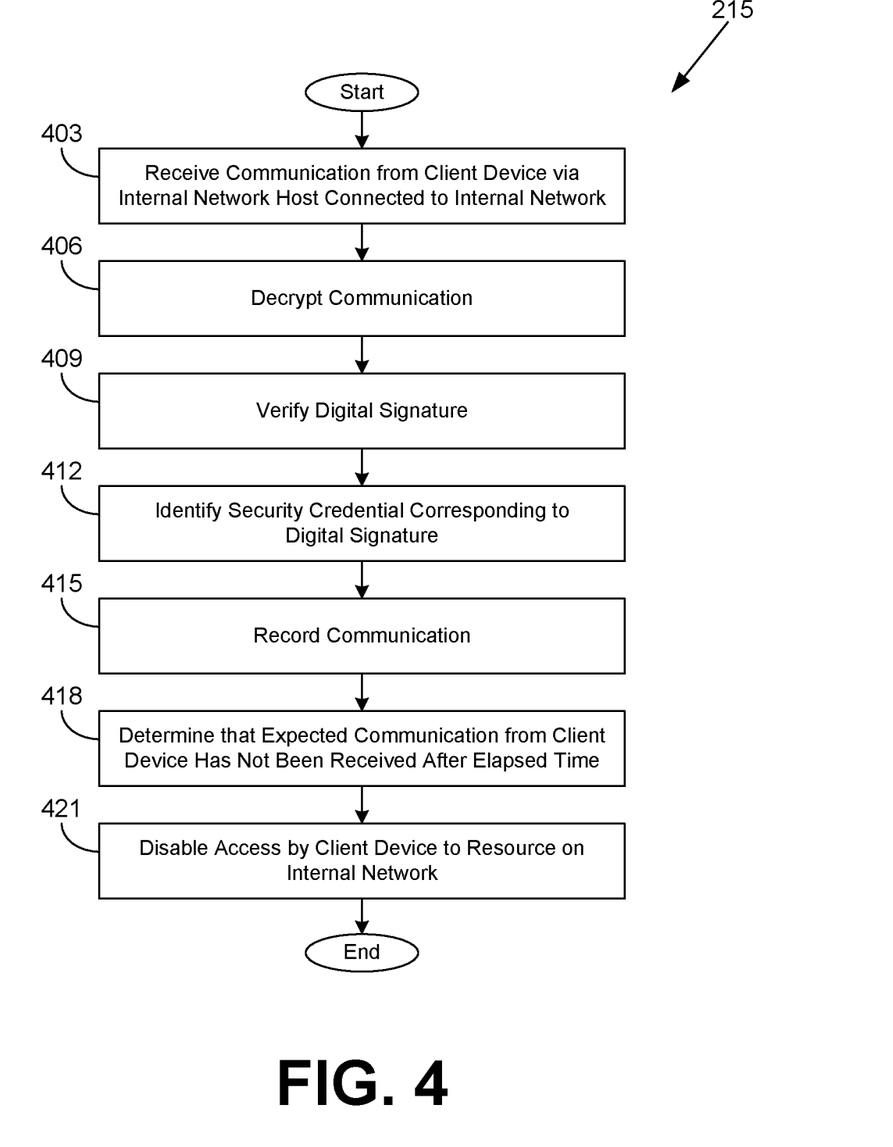
FIG. 4 is a flowchart illustrating one example of functionality implemented as portions of an internal lockout service executed in a computing environment in the networked environment of FIG. 2 according to various embodiments of the present disclosure.

Moving on to FIG. 4, shown is a flowchart that provides one example of the operation of a portion of the internal lockout service 215 according to various embodiments. It is understood that the flowchart of FIG. 4 provides merely an example of the many different types of functional arrangements that may be employed to implement the operation of the portion of the internal lockout service 215 as described herein. As an alternative, the flowchart of FIG. 4 may be viewed as depicting an example of elements of a method implemented in the computing environment 203 (FIG. 2) according to one or more embodiments.

Beginning with box 403, the internal lockout service 215 receives a communication from a client device 103 (FIG. 2) via an internal network host connected to the internal network 109 (FIG. 2). The communication application 257 (FIG. 2) on the client device 103 is configured to repeatedly send similar communications at periodic intervals, e.g., hourly, daily, or at some other interval. In box 406, the internal lockout service 215 decrypts the communication using a private key. For example, the communication may be decrypted by decrypting a symmetric key using the private key, and then using the decrypted symmetric key to decrypt the communication. In box 409, the internal lockout service 215 verifies a digital signature in the communication. In box 412, the internal lockout service 215 identifies a security credential 251 (FIG. 2) or account associated with the digital signature. In box 415, the internal lockout service 215 records the communication in the account data 233 (FIG. 2) in association with the account.

In box 418, the internal lockout service 215 determines that an expected communication from the client device 103 has not been received after a threshold elapsed time. For example, the client device 103 may be removed from the internal network 109 and coupled to the external network 112. The internal lockout service 215 may be inaccessible from the external network 112.

In box 421, in response to failing to receive the expected communication, the internal lockout service 215 disables access by the client device 103 to one or more internal network resources 237 (FIG. 2) of the internal network 109. For example, the external lockout service 218 may revoke the security credential 251, disable the corresponding account, blacklist a network address of the client device 103, or take other actions. Thereafter, the operation of the portion of the internal lockout service 215 ends.

Figure 5:
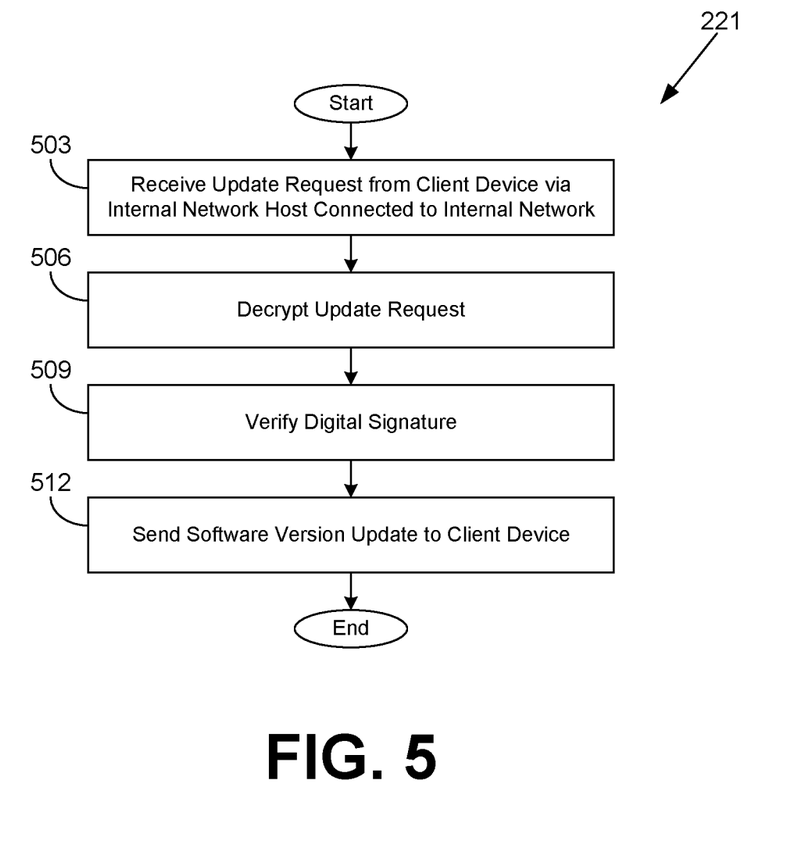
FIG. 5 is a flowchart illustrating one example of functionality implemented as portions of an internal update service executed in a computing environment in the networked environment of FIG. 2 according to various embodiments of the present disclosure.

Turning now to FIG. 5, shown is a flowchart that provides one example of the operation of a portion of the internal update service 221 according to various embodiments. It is understood that the flowchart of FIG. 5 provides merely an example of the many different types of functional arrangements that may be employed to implement the operation of the portion of the internal update service 221 as described herein. As an alternative, the flowchart of FIG. 5 may be viewed as depicting an example of elements of a method implemented in the computing environment 203 (FIG. 2) according to one or more embodiments.

Beginning with box 503, the internal update service 221 receives an update request from a client device 103 (FIG. 2) via an internal network host that is connected to the internal network 109 (FIG. 2). For example, the update application 254 (FIG. 2) may be directed to the internal update service 221 by the private DNS server 227 (FIG. 2) when resolving a predefined hostname. The update application 254 may upon start-up, periodically, or in response to an event send the update request. The internal update service 221 may be inaccessible from the external network 112 (FIG. 2) and blocked by the firewall 206 (FIG. 2).

In box 506, the internal update service 221 decrypts the update request using a private key. For example, the communication may be decrypted by decrypting a symmetric key using the private key, and then using the decrypted symmetric key to decrypt the communication. In box 509, the internal update service 221 verifies a digital signature in the update request. In box 512, the internal update service 221 sends a software version update 239 (FIG. 2) to the client device 103 for installation on the client device 103. The software version update 239 may be a different version of software already installed on the client device 103. In some cases, no software version update 239 is available, in which case no update is then sent to the client device 103. Thereafter, the operation of the portion of the internal update service 221 ends.

Figure 6:
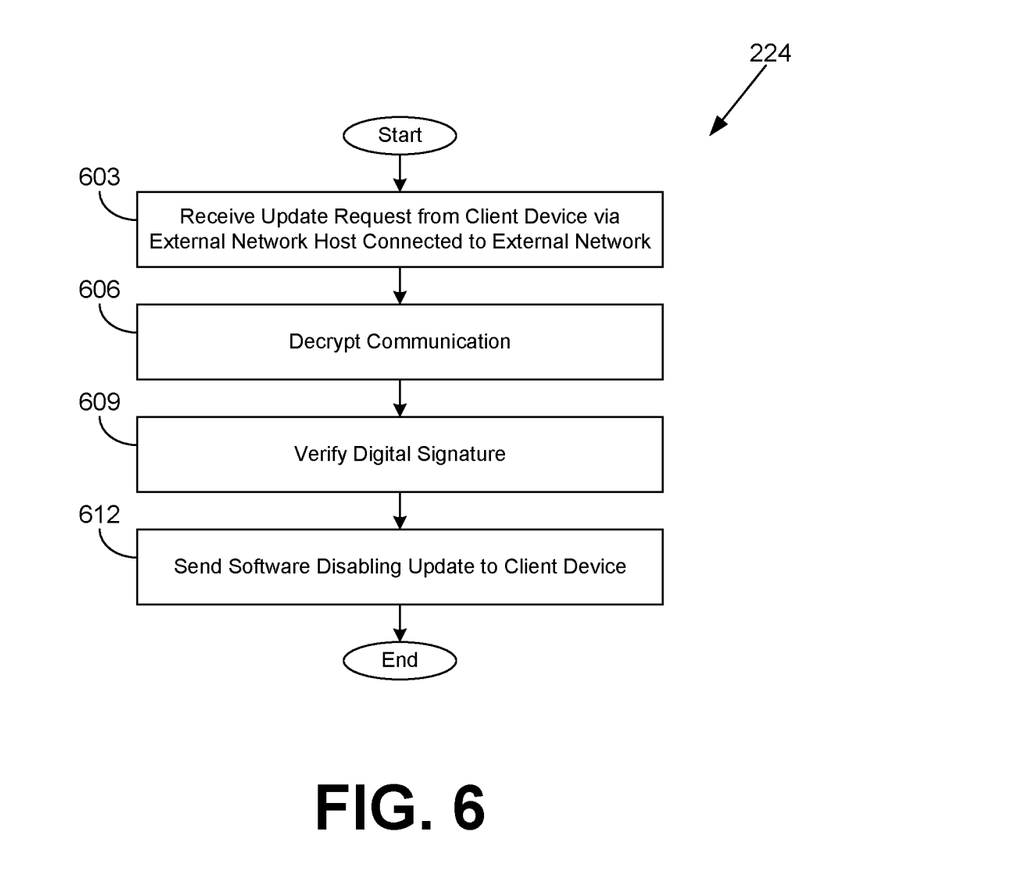
FIG. 6 is a flowchart illustrating one example of functionality implemented as portions of an external update service executed in a computing environment in the networked environment of FIG. 2 according to various embodiments of the present disclosure.

Continuing to FIG. 6, shown is a flowchart that provides one example of the operation of a portion of the external update service 224 according to various embodiments. It is understood that the flowchart of FIG. 6 provides merely an example of the many different types of functional arrangements that may be employed to implement the operation of the portion of the external update service 224 as described herein. As an alternative, the flowchart of FIG. 6 may be viewed as depicting an example of elements of a method implemented in the computing environment 203 (FIG. 2) according to one or more embodiments.

Beginning with box 603, the external update service 224 receives an update request from a client device 103 (FIG. 2) via an external network host that is connected to the external network 112 (FIG. 2). For example, the update application 254 (FIG. 2) may be directed to the external update service 224 by the public DNS server 230 (FIG. 2) when resolving a predefined hostname. The client device 103 may be normally connected to the internal network 109 (FIG. 2). For example, the client device 103 may be of a sensitive nature, being pre-release or beta hardware, or may store highly confidential information. The update application 254 may upon start-up, periodically, or in response to an event send the update request. The external update service 224 may be inaccessible from the internal network 109 and blocked by the firewall 206 (FIG. 2).

In box 606, the external update service 224 decrypts the update request using a private key. For example, the communication may be decrypted by decrypting a symmetric key using the private key, and then using the decrypted symmetric key to decrypt the communication. In box 609, the external update service 224 verifies a digital signature in the update request. This confirms the identity of the user or device that has sent the update request, so that action may not be improperly taken against client devices 103 that are not controlled by the organization that operates the internal network 109. Also, in some cases, the external update service 224 may record in the data store 212 (FIG. 2) identifying information for the client device 103 (e.g., based upon the signature verification or other identifying data from the client device 103) so that the organization can know which client device 103 was improperly leaked.

In box 612, the external update service 224 sends a software disabling update 242 (FIG. 2) to the client device 103 for installation on the client device 103. The software disabling update 242 may disable access of the client device 103 to internal network resources 237 (FIG. 2). In some cases, the software disabling update 242 may modify firmware of the client device 103 to render it "bricked" or completely unusable. This may be desirable in order to prevent secret or beta hardware that is lost or stolen from being used outside of the internal network 109. The external update service 224 may additionally or alternatively disable the account or revoke security credentials 251 (FIG. 2) associated with the update request. Thereafter, the operation of the portion of the external update service 224 ends.

Figure 7:
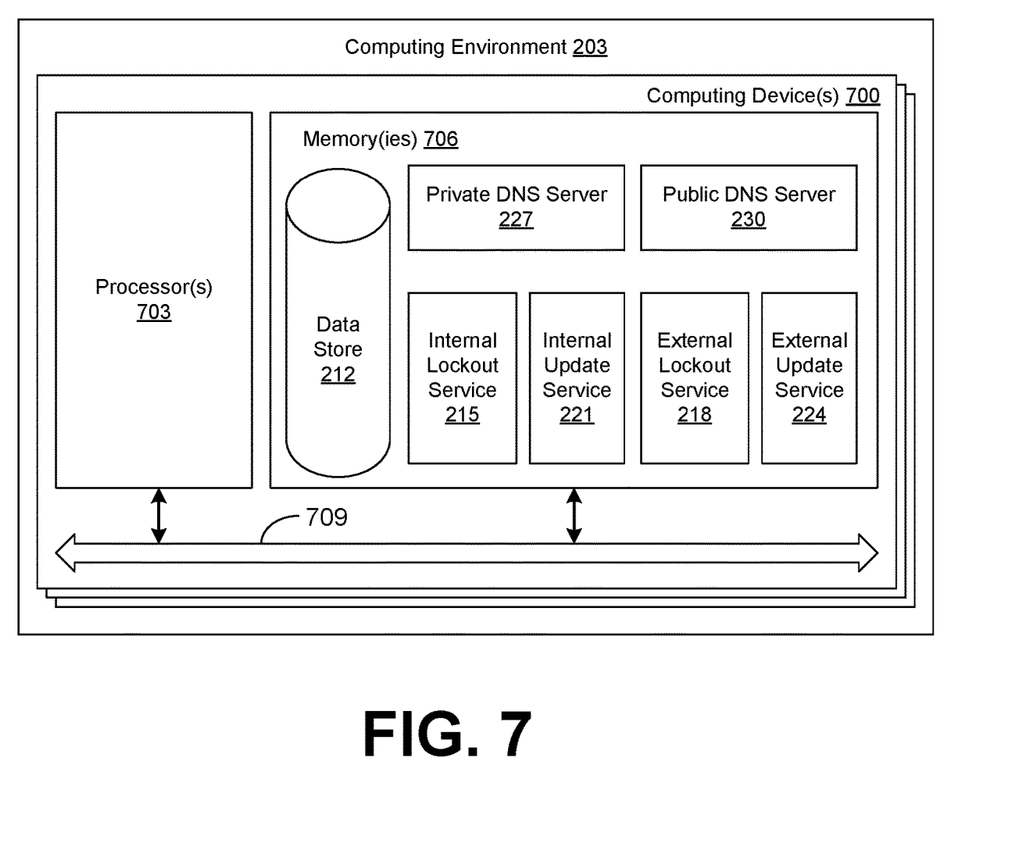
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 203 according to an embodiment of the present disclosure. The computing environment 203 includes one or more computing devices 700.

Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the internal lockout service 215, the external lockout service 218, the internal update service 221, the external update service 224, the private DNS server 227, the public DNS server 230, and potentially other applications. Also stored in the memory 706 may be a data store 212 and other data. In addition, an operating system may be stored in the memory 706 and executable by the processor 703.

It is understood that there may be other applications that are stored in the memory 706 and executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores, and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the internal lockout service 215, the external lockout service 218, the internal update service 221, the external update service 224, the private DNS server 227, the public DNS server 230, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-6 show the functionality and operation of an implementation of portions of the internal lockout service 215, the external lockout service 218, the internal update service 221, and the external update service 224. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 3-6 show a specific order of execution, it is understood that the order of execution may differ from that which is depicted. For example, the order of execution of two or more blocks may be scrambled relative to the order shown. Also, two or more blocks shown in succession in FIGS. 3-6 may be executed concurrently or with partial concurrence. Further, in some embodiments, one or more of the blocks shown in FIGS. 3-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the internal lockout service 215, the external lockout service 218, the internal update service 221, the external update service 224, the private DNS server 227, and the public DNS server 230, that comprises software or code can be embodied in any non-transitory computer-readable medium for use by or in connection with an instruction execution system, such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the internal lockout service 215, the external lockout service 218, the internal update service 221, the external update service 224, the private DNS server 227, and the public DNS server 230, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices 700 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   receiving, via at least one of one or more computing devices, a communication from a client device via an external network host connected to an external network, wherein the client device is configured to initiate the communication to the external network host on a repeated basis, and the external network host is unreachable from an internal network due to at least one of: a firewall or a split-horizon domain name system (DNS) configuration;
   decrypting, via at least one of the one or more computing devices, the communication using a private key;
   extracting, via at least one of the one or more computing devices, a digital signature from the decrypted communication;
   identifying, via at least one of the one or more computing devices, a security credential used to generate the digital signature; and
   revoking, via at least one of the one or more computing devices, the security credential in response to receiving the communication.

2. The method of claim 1, wherein the client device is configured to initiate the communication to the external network host upon start up.

3. The method of claim 1, wherein the client device is configured to initiate the communication to the external network host at a periodic interval.

4. A system, comprising:
   at least one computing device; and
   at least one application executable in the at least one computing device, wherein when executed the at least one application causes the at least one computing device to at least:
      receive a communication from a client device via an external network host connected to an external network, wherein the client device is configured to initiate the communication to the external network host on a repeated basis, and the external network host is unreachable from an internal network; and
      disable access by the client device to at least one resource on the internal network in response to receiving the communication.

5. The system of claim 4, wherein disabling the access by the client device to the at least one resource on the internal network further comprises sending a software update to the client device that causes the client device to disable functionality on the client device.

6. The system of claim 4, wherein disabling the access by the client device to the at least one resource on the internal network further comprises revoking a security credential used by the client device.

7. The system of claim 6, wherein the security credential comprises a private key, the communication includes a digital signature generated by the private key, and when executed the at least one application further causes the at least one computing device to at least identify the security credential to be revoked based at least in part on the digital signature.

8. The system of claim 7, wherein the digital signature is encrypted using a public key associated with the external network host.

9. The system of claim 4, wherein the client device is normally used on the internal network and not the external network.

10. The system of claim 4, wherein the external network host is unreachable from the internal network due to a firewall that blocks at least one of: a port associated with the communication, or a network address of the external network host.

11. The system of claim 4, wherein the external network host is unreachable from the internal network due to a private domain name system (DNS) server used on the internal network that resolves a hostname of the external network host differently from a public DNS server used on the external network.

12. The system of claim 4, wherein when executed the at least one application further causes the at least one computing device to at least:
   determine that an expected communication from a second client device has not been received via an internal network host, wherein the second client device is configured to initiate the expected communication to the internal network host on the repeated basis, and the internal network host is unreachable from the external network; and
   disable access by the second client device to the at least one resource on the internal network in response to determining that the expected communication from the second client device has not been received.

13. The system of claim 12, wherein disabling the access by the client device to the at least one resource on the internal network further comprises revoking a security credential associated with the client device.

14. A method, comprising:
   receiving, via at least one of one or more computing devices, an update request from a client device;
   determining, via at least one of the one or more computing devices, that the update request is received via an external network instead of an internal network; and
   sending, via at least one of the one or more computing devices, a software update to the client device, wherein an installation of the software update on the client device causes access by the client device to at least one resource on the internal network to be disabled.

15. The method of claim 14, further comprising:
   receiving, via at least one of the one or more computing devices, a prior update request from the client device;
   determining, via at least one of the one or more computing devices, that the prior update request is received via the internal network; and
   sending, via at least one of the one or more computing devices, a prior software update to the client device, wherein an installation of the prior software update on the client device causes software on the client device to be updated to a different version.

16. The method of claim 14, wherein the client device is configured to send the update request to a specified network host on a repeated basis.

17. The method of claim 16, wherein a private domain name system (DNS) server on the internal network resolves a hostname of the specified network host to a first network address on the internal network, and a public DNS server on the external network resolves the hostname of the specified network host to a second network address on the external network, and determining that the update request is received via the external network instead of the internal network further comprises determining, via at least one of the one or more computing devices, that the update request is received via the second network address instead of the first network address.

18. The method of claim 14, wherein the installation of the software update on the client device causes the client device to be unusable.

19. The method of claim 14, further comprising:
   identifying, via at least one of the one or more computing devices, a security credential based at least in part on a digital signature in the update request; and
   revoking, via at least one of the one or more computing devices, the security credential.

20. The method of claim 14, further comprising verifying, via at least one of the one or more computing devices, an identity of the client device based at least in part on a digital signature in the update request.

* * * * *